W. L. SMYTH.
SAW BLADE STRETCHER.
APPLICATION FILED AUG. 9, 1912.
1,049,934. Patented Jan. 7, 1913.
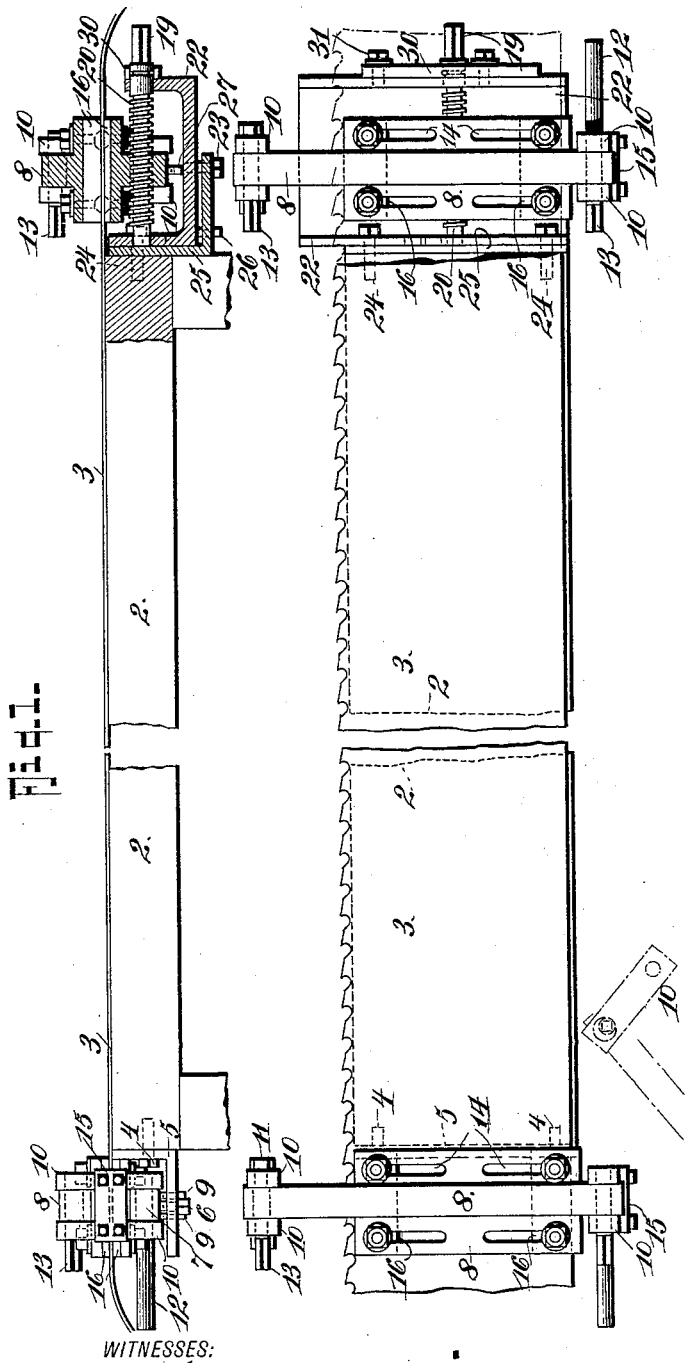
WITNESSES:
John S. Schrott
Robert M. Grinwell
INVENTOR
Walter L. Smyth
BY
Fred G. Dieterich & Co.
ATTORNEYS.

UNITED STATES PATENT OFFICE.

WALTER L. SMYTH, OF VANCOUVER, BRITISH COLUMBIA, CANADA.

SAW-BLADE STRETCHER.

1,049,934.    Specification of Letters Patent.    Patented Jan. 7, 1913.

Application filed August 9, 1912. Serial No. 714,201.

*To all whom it may concern:*

Be it known that I, WALTER L. SMYTH, citizen of the Dominion of Canada, residing at Vancouver, in the Province of British Columbia, Canada, have invented a new and useful Saw-Blade Stretcher, of which the following is a specification.

This invention relates to a device for stretching a length of an endless band saw over the bench block that its condition under strain may be examined and corrected to the requirements of its use.

To obtain the best results from a band saw it should be edge bound to an extent that it will not, when free, lie flat on a bench block, but will be alternately convex or concave across the blade throughout its undulations. In the process of putting this edge tension on a saw by means of the rolls, lumps and ridges will show indicating that the tension is not uniform, and these lumps must be removed to put the saw in a satisfactory condition for examination under the tension gage.

If the edges of the saw are stretched to relieve the stress of the central portion, lumps due to irregular stress will show, as if correct, the saw, when stretched, will lie flat on the bench block. It is to apply this edge tension and detect the existence of these lumps and enable them to be released by the hammer that the stretching device, which is the subject of this application, has been devised for use in a saw blade where excessive tension is desired.

The invention comprises a means at each end of the block for rapidly clamping the saw blade adjacent to its edges, for applying any required tension to the blade suited to the requirements of its work, and for adjustment of the clamping and stretching devices to varying widths of blade so that the stretching effort may be applied to the middle line between the edge clamps.

The invention is particularly described in the following specification, reference being made to the drawings by which it is accompanied, in which:

Figure 1 is a front elevation and part section of the bench block with the saw clamping and stretching device applied to a length of saw blade on the block. Fig. 2 is a plan of the same. Fig. 3 is an end elevation of the fixed clamp at the left end of the device showing the clamping member as opened for the admission of the saw, and Fig. 4 is an end elevation of the movable or stretching clamp member at the other end of the block.

In these drawings 2 represents the heavy bench block of cast iron, on the planed upper surface of which a length of the saw blade 3 is stretched for examination and treatment.

The clamp, by which the thickness of the saw is gripped adjacent to its edges, comprises lower and upper clamp members 7 and 8. These members are T shaped in cross section as far as the width of the block and the horizontal components of the cross section are turned toward one another. The heavier web or vertical component of the T section is produced beyond the width of the block and these ends are pin-connected together by links 10.

The pins 11 and 12, which connect the links 10 to the bottom clamp member 7, are plainly cylindrical. The back one 11 is provided with a head and nut for screwing it in position, but the front one 12, as it requires to be removable to allow the upper clamp member to be swung back, as shown in Fig. 3, for the introduction of the saw, is made longer, as shown in the drawing, to afford a hand grasp and its end is slightly tapered to facilitate entrance into its pinholes.

The pins 13 of the upper clamp member 8, both back and front, are eccentric, where they pass through the clamp member, to their bearings in the links 10, and one end of each pin is produced beyond the links and is squared for the reception of a lever handle by which each eccentric pin may be turned to clamp the saw. The front links 10, as they have no securing head or nut on their pins, are connected together by a yoke 15.

As the clamps are designed to grip on the saw blade adjacent only to each edge of it, bearing grips 16 are secured across the width of each clamp adjacent to the edges of the blade 3, and that the device may be used on saw blades of varying widths, these bearing pieces 16 are adjustable in their distance apart by providing slotted apertures 14 for the securing cap screws.

The bearing pieces 16, which are attached to the upper clamp member, may be made relatively deeper than those of the lower clamp member, as shown in the right hand clamp, to allow the light to pass under the clamp and enable the blade under treatment to be better examined with straight edge or gages. This constitutes the saw clamp, which is provided at each end of the bench block 2 across which the saw is to be stretched. One of these clamps is fixed as regards endwise movement in relation to the block 2 and the other is movable endwise to stretch the saw.

The fixed clamp, which is shown to the left in the drawings, is mounted on an angle iron 5 which is secured by cap screws 4 to the end of the bench block 2. To this angle iron 5 the lower member 7 of the clamp is secured by cap screws 6 which pass through 5 and are threaded into the clamp member 7.

Although fixed in relation to the block as regards endwise movement, the clamp is adjusted vertically to the plane of the upper surface of the bench block by set screws 9, which are threaded in the angle iron 5, one on each side of each securing cap screw 6, and bear against the underside of the clamp member 7.

The movable or stretching clamp, the construction of which is practically the same as has been described, is attached to an angle iron 25 which is secured to the other end of the bench block 2 by cap screws 24. The clamp is mounted on a screw 20 having a handle square 19, and this screw is threaded into the lower member 7 of the clamp as into a nut, and to enable the clamp and its screw to be adjusted, the screw is mounted in a member 22 having upwardly turned ends for the reception of the bearings of the screw. This member 22 is secured to the angle iron 25 by cap screws 23 passing through the angle iron 25 and threaded in 22, and by the cap screws 24 which hold the angle iron to the end of the block 2.

The member 22 is vertically movable to adjust the face of the clamp to the upper plane of the bench block 2 by set screws 26, for which adjustment the holes in the member 22 through which the securing cap screws 24 pass, are vertically elongated.

Set screws 27 threaded into the underside of the lower clamp member 7 at each end enable the clamp to be adjusted to the plane of the upper surface of the bench block and set screws 26 are provided to adjust the axis of the screw 20 parallel to the same plane.

To enable the axis of the screw 20 to be adjusted laterally to the middle line of saws of varying width, a series of apertures are provided for the inner end of the screw in the adjacent upwardly turned end of the member 22 and the other end of the screw is rotatable in a bearing piece 30 which is secured to the outer upwardly turned end of 22, lateral adjustment being provided for in the elongated aperture in 22 through which the screw 20 passes, and in the elongated aperture for the securing cap screws 31 of the bearing piece 30. The screw end bearing in 30 has an annular groove to engage a retaining pin or set screw.

In use, the pins 12 are withdrawn and the upper clamp members 8 are swung backward clear of the bench block 2, as shown by the dot and dash lines in Fig. 3, to enable the saw to be laid on the bench block. The bearing pieces 16 of the clamps and the stretching screw 20 are then adjusted to the width of the saw under consideration. The upper members of the clamps are then restored to their normal position and the pins 12 reinserted to retain them there. The saw is quickly clamped by means of the eccentric pins 13 and the required tension is exerted on the blade by the screw 20. Any lumps and ridges are then relieved by the hammer while the saw is stretched on the bench block and when this is done on one length of the saw, the eccentric pins 13 are turned to release the clamps and the saw is drawn over the block 2 to bring the next length of it under observation and treatment.

Having now particularly described my invention and the manner of its use, I hereby declare that what I claim as new and desire to be protected in by Letters Patent, is:

1. A band saw stretching device, comprising the combination with a bench block, of means for clamping the saw blade adjacent to its edges and means for stretching the length of the blade resting on the block.

2. A band saw stretching device, comprising the combination with a bench block, of a clamp fixed to one end of the block and adapted to grip a saw blade adjacent to its edges, a similar clamp connected to the other end of the block and means connected to the bench block for imparting an endwise movement to the clamp in relation to the block.

3. A band saw stretching device, comprising the combination with a bench block, of a clamp attached to each end of the block, each clamp composed of an upper and lower member adapted to grip between them the flat of a saw adjacent to its edges, said clamp members pin-connected together by links, the upper pin having eccentric bearings that when rotated will forcibly press the upper clamp member down on the lower, provision whereby these eccentric pins may be rotated, and provision whereby the clamp at one end may be moved endwise to and from the clamp at the other end of the block.

4. A band saw stretching device, comprising the combination with a bench block, of a saw blade clamp secured to one end of the block and fixed thereto in regard to endwise movement but susceptible of vertical adjustment to the plane of the upper surface of the block, means for operating the clamp to securely grip the saw blade adjacent to the edges, a similar clamp secured to the other end of the block and having provision for vertical adjustment to the plane of the upper surface of the block and provision for endwise moving the clamp in relation to the block.

5. A band saw stretching device, comprising the combination with a bench block, of a saw securing clamp at each end, each clamp comprising upper and lower clamp members pin-connected together, the pins of the upper clamp member being eccentric and having squared ends for the reception of an operating lever, the adjacent faces of the clamping members having bearing strips which are adjustable on the clamp to varying widths of saw, means for securing one of these clamps to one end of the bench block, means for vertically adjusting it to the plane of the upper side of the block, means for attaching a similar clamp to the other end of the block, means for vertically adjusting it to the plane of the upper surface of the block, means for lengthwise moving it from or to the bench block, said means comprising a screw rotatably mounted in a frame connected to the bench block, means for adjusting the axis of the screw parallel to the upper surface of the block and means for laterally adjusting the axis of the screw to the middle line of a saw on the bench block.

6. A band saw stretching device, comprising the combination with a bench block, of a clamp fixed at one end and adapted to grip the thickness of a saw blade adjacent to its edges, of a similar clamp mounted on a screw at the other end of the bench block, said screw rotatable in a frame adjustably secured to the end of the bench block, means for laterally adjusting the bearing members of the clamps to the width of the saw and means for laterally adjusting the axis of the tightening screw to the middle line of the same.

In testimony whereof I have signed my name to this specification in the presence of two subscribing witnesses.

WALTER L. SMYTH.

Witnesses:
 ROWLAND BRITTAIN,
 MAY WHYTE.

---

Copies of this patent may be obtained for five cents each, by addressing the "Commissioner of Patents, Washington, D. C."